US012542642B2

(12) United States Patent
Ma et al.

(10) Patent No.: US 12,542,642 B2
(45) Date of Patent: Feb. 3, 2026

(54) INFORMATION TRANSMISSION METHOD AND COMMUNICATION APPARATUS

(71) Applicant: Huawei Technologies Co., Ltd., Shenzhen (CN)

(72) Inventors: Ruixiang Ma, Shenzhen (CN); Lei Guan, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 377 days.

(21) Appl. No.: 18/164,830

(22) Filed: Feb. 6, 2023

(65) Prior Publication Data
US 2023/0188301 A1 Jun. 15, 2023

Related U.S. Application Data

(63) Continuation of application No. PCT/CN2020/107853, filed on Aug. 7, 2020.

(51) Int. Cl.
*H04L 5/00* (2006.01)
(52) U.S. Cl.
CPC ................. *H04L 5/0055* (2013.01)
(58) Field of Classification Search
CPC ....... H04L 5/0055; H04L 1/16; H04L 1/1887; H04L 1/1854
USPC ........................................................ 370/329
See application file for complete search history.

(56) References Cited

U.S. PATENT DOCUMENTS

2018/0279274 A1   9/2018  Sun et al.
2020/0214006 A1*  7/2020  Choi ................... H04L 1/0006
2022/0399979 A1* 12/2022  Gao .................... H04L 1/1614

FOREIGN PATENT DOCUMENTS

| CN | 110972277 A   | 4/2020 |
| CN | 111263446 A   | 6/2020 |
| CN | 111316731 A   | 6/2020 |
| CN | 111434072 A   | 7/2020 |
| EP |   4057554 A1  | 9/2022 |
| JP | 2019504516 A  | 2/2019 |
| WO | 2018019085 A1 | 2/2018 |

OTHER PUBLICATIONS

Samsung, "Discussion for enhancements for IIoT", R1-1912478, Nov. 18-22, 2019 (From Applicant's IDS) (Year: 2019).*
Huawei et al., "Enhancements on multi-TRP/panel transmission", 3GPP TSG WG1 Meeting#98bis, R1-1910073, Chongqing, China, Oct. 14-20, 2019, 30 pages.
Huawei et al., "Other aspects for URLLC/IIOT enhancements", 3GPP TSG RAN WG1 Meeting #98bis, R1-1910398, Chongqing, China, Oct. 14-20, 2019, 7 pages.

(Continued)

*Primary Examiner* — Mang Hang Yeung

(57) ABSTRACT

This application provides an information transmission method and a communication apparatus. The method includes: A terminal device determines a first resource in a first time unit, where the first resource carries first feedback information, and the first feedback information is feedback information of first data; and the terminal device sends the first feedback information to a network device on a second resource in a second time unit in the case that the first resource includes a non-uplink resource, where the second time unit is a time unit later than the first time unit in time.

12 Claims, 4 Drawing Sheets

(56) References Cited

OTHER PUBLICATIONS

3GPP TS 38.213 V16.2.0 (Jun. 2020), 3rd Generation Partnership Project; Technical Specification Group Radio Access Network; NR; Physical layer procedures for control (Release 16), 176 pages.
3GPP TS 38.331 V16.1.0 (Jul. 2020), 3rd Generation Partnership Project; Technical Specification Group Radio Access Network; NR; Radio Resource Control (RRC) protocol specification (Release 16), 906 pages.
LG Electronics, Summary#2 of 7. 2. 6. 7 Others[online], 3GPP TSG RAN WG1 #99 R1-1913451, Nov. 22, 2019, total 26 pages.
Motorola Mobility, Lenovo, HARQ-ACK feedback for enhanced DL SPS [online], 3GPP TSG RAN WG1 #99 R1-1912854, Nov. 22, 2019, total 4 pages.
Mediatek Inc, "Multiple HARQ procedures and intra-UE UCI prioritization", 3GPP Draft, R1-1911079, Oct. 8, 2019, XP051809275, 12 pages.
Samsung, "Discussion for enhancements for IIoT", 3GPP Draft, R1-1912478, Nov. 8, 2019, XP051820059, 3 pages.

* cited by examiner

INFORMATION TRANSMISSION METHOD AND COMMUNICATION APPARATUS

CROSS-REFERENCE TO RELATED APPLICATIONS

This application is a continuation of International Application No. PCT/CN2020/107853, filed on Aug. 7, 2020, the disclosure of which is hereby incorporated by reference in its entirety.

TECHNICAL FIELD

This application relates to the field of communications, and more specifically, to an information transmission method and a communication apparatus.

BACKGROUND

In a mobile communication system, use of radio resources is centrally planned by a network side, so that wireless communication tasks in the system are performed in an orderly manner under control of the network side. Correspondingly, a terminal device needs to follow instructions of the network side to use a radio resource for communication. However, with wide application of mobile communication, mobile communication services become increasingly diversified and have different requirements. It is inevitable that a conflict occurs between a plurality of instructions sequentially sent by a network device. As a result, the terminal device cannot determine which instruction to follow, causing a waste of resources or a communication interruption, and affecting communication quality. How to avoid deterioration of communication quality due to conflicts between instructions becomes a problem to be resolved by a person skilled in the art.

SUMMARY

This application provides an information transmission method and a communication apparatus, to reduce a waste of communication resources.

According to a first aspect, an information transmission method is provided. The method may be performed by a terminal device or a module (for example, a chip) configured on (or used for) the terminal device. Description is made below by using an example in which the method is performed by a terminal device.

The method includes: A terminal device determines a first resource in a first time unit, where the first resource carries first feedback information, and the first feedback information is feedback information of first data; and the terminal device sends the first feedback information to a network device on a second resource in a second time unit in the case that the first resource includes a non-uplink resource, where the second time unit is a time unit later than the first time unit in time.

According to the foregoing solution, in the case that the first feedback information cannot be sent because the first resource in the first time unit includes the non-uplink resource, the terminal device sends the first feedback information on the second resource in the second time unit. In this case, a waste of resources caused because the network device cannot receive the feedback information of the terminal device on the first resource can be reduced, or a waste of resources caused by retransmission of the first data by the network device because the terminal device does not send the feedback information can be reduced, thereby improving utilization of communication resources and reducing a time delay.

With reference to the first aspect, in some implementations of the first aspect, the first resource includes M symbols, a quantity of uplink symbols included in the second time unit is greater than or equal to M, and M is an integer greater than 0.

According to the foregoing solution, it can be ensured that there are plenty of uplink resources in the second time unit for sending the first feedback information.

With reference to the first aspect, in some implementations of the first aspect, the second time unit is a time unit closest to the first time unit in time among one or more third time units; and the first resource includes M symbols, the third time units are time units in which a quantity of uplink symbols is greater than or equal to M, and M is an integer greater than 0, or the third time units are time units including only uplink symbols.

According to the foregoing solution, it can be ensured that there are plenty of uplink resources in the second time unit for sending the first feedback information, and a time delay for sending the first feedback information can be reduced as much as possible.

With reference to the first aspect, in some implementations of the first aspect, a time interval between the second time unit and the first time unit is less than or equal to a first time interval; or an interval between the second time unit and a time unit in which a first downlink shared channel PDSCH is located is less than or equal to the first time interval, and the first PDSCH carries the first data.

According to the foregoing solution, a maximum time delay for sending the feedback information is set. When the feedback information still cannot be sent after the maximum time delay is exceeded, the network device may retransmit the first data, so that a transmission delay of the first data caused because the feedback information cannot be sent can be reduced.

With reference to the first aspect, in some implementations of the first aspect, the method further includes: The terminal device receives first information from the network device, where the first information indicates one or more second time intervals, and each of the second time intervals is a time interval between a time unit in which a downlink shared channel is located and a time unit in which feedback information of the downlink shared channel is located. The first time interval is equal to a maximum time interval among the one or more second time intervals.

According to the foregoing solution, the second time interval in the existing mechanism is reused as the first time interval, simplifying a system design.

With reference to the first aspect, in some implementations of the first aspect, the method further includes: The terminal device receives second information from the network device, where the second information indicates the first time interval.

With reference to the first aspect, in some implementations of the first aspect, the first data is data for first semi-persistent scheduling, and the second information is downlink control information for activating the first semi-persistent scheduling.

According to the foregoing solution, the first time interval is indicated in the second information for activating the first semi-persistent scheduling, so that in the case that the first feedback information cannot be sent on the first resource, the second time unit for sending the first feedback information can be determined based on the second information.

With reference to the first aspect, in some implementations of the first aspect, the first data is data for first semi-persistent scheduling, the second information is carried in first indication information, the first indication information further includes an identifier of a semi-persistent scheduling group, and the first semi-persistent scheduling belongs to the semi-persistent scheduling group.

According to the foregoing solution, a same first time interval is used for semi-persistent scheduling in the semi-persistent scheduling group, so that it can be avoided that the first time interval is indicated for the semi-persistent scheduling one by one, thereby reducing signaling overheads.

With reference to the first aspect, in some implementations of the first aspect, that the terminal device sends the first feedback information to a network device on a second resource in a second time unit includes: The terminal device sends a first hybrid automatic repeat request HARQ-ACK codebook to the network device on the second resource in the second time unit, where the first HARQ-ACK codebook includes the first feedback information.

According to the foregoing solution, a plurality of pieces of feedback information are sent in a form of a codebook, so that utilization of system resources can be improved.

With reference to the first aspect, in some implementations of the first aspect, the method further includes: the terminal device sends a second HARQ-ACK codebook to the network device on a third resource in the second time unit, where the second HARQ-ACK codebook includes second feedback information, and the second feedback information is feedback information of second data. According to the foregoing solution, the terminal device sends the first feedback information on the second resource in the second time unit, and sends, on the third resource, the second feedback information that is sent in the second time unit and that is determined by a time sequence relationship between data and feedback information of the data, so that the network device can distinguish between different feedback information.

With reference to the first aspect, in some implementations of the first aspect, that the terminal device sends a first HARQ-ACK codebook to the network device on the second resource in the second time unit includes: The terminal device sends the first HARQ-ACK codebook to the network device on the second resource in the case that a third resource partially or completely overlaps a third resource and a priority of the first HARQ-ACK codebook is higher than a priority of a second HARQ-ACK codebook, where the third resource carries the second HARQ-ACK codebook including second feedback information, and the second feedback information is feedback information of second data.

According to the foregoing solution, when a resource sending conflict occurs, a high-priority HARQ-ACK codebook is sent, so that a time delay and reliability of a high-priority service can be ensured.

With reference to the first aspect, in some implementations of the first aspect, that the terminal device sends a first HARQ-ACK codebook to the network device on the second resource in the second time unit includes: The terminal device sends the first HARQ-ACK codebook to the network device on the second resource in the case that a third resource partially or completely overlaps a fourth resource and a priority of the second HARQ-ACK codebook is the same as a priority of a third HARQ-ACK codebook. The first HARQ-ACK codebook includes the first feedback information and second feedback information, the third resource carries the second HARQ-ACK codebook including the second feedback information, and the second feedback information is feedback information of second data. The fourth resource carries a third HARQ-ACK codebook including the first feedback information.

According to the foregoing solution, when a resource sending conflict occurs and priorities of HARQ-ACK codebooks are the same, the HARQ-ACK codebooks are combined into the first HARQ-ACK codebook to send the first feedback information and the second feedback information, so that it can be ensured that the feedback information is sent in time.

With reference to the first aspect, in some implementations of the first aspect, the first data is data for first semi-persistent scheduling, the first HARQ-ACK codebook further includes second feedback information, and the second feedback information is feedback information of second data.

According to the foregoing solution, the first feedback information and the second feedback information that is sent in the second time unit and that is determined by a time sequence relationship between data and feedback information of the data are sent in a same codebook, so that generation of a plurality of codebooks can be avoided, and use of a plurality of uplink resources can be avoided. This saves communication resources.

With reference to the first aspect, in some implementations of the first aspect, the non-uplink resource includes one or more of the following resources: a downlink resource, a flexible resource, or a reserved resource.

According to a second aspect, an information transmission method is provided. The method may be performed by a network device or a module (for example, a chip) configured on (or used for) the network device. Description is made below by using an example in which the method is performed by a network device.

The method includes: A network device determines a first resource in a first time unit, where the first resource carries first feedback information, and the first feedback information is feedback information of first data; and the network device receives the first feedback information from a terminal device on a second resource in a second time unit in the case that the first resource includes a non-uplink resource, where the second time unit is a time unit later than the first time unit in time.

With reference to the second aspect, in some implementations of the second aspect, the first resource includes M symbols, a quantity of uplink symbols included in the second time unit is greater than or equal to M, and M is an integer greater than 0.

With reference to the second aspect, in some implementations of the second aspect, the second time unit is a time unit closest to the first time unit in time among one or more third time units; and the first resource includes M symbols, the third time units are time units in which a quantity of uplink symbols is greater than or equal to M, and M is an integer greater than 0, or the third time units are time units including only uplink symbols.

With reference to the second aspect, in some implementations of the second aspect, a time interval between the second time unit and the first time unit is less than or equal to a first time interval; or an interval between the second time unit and a time unit in which a first downlink shared channel PDSCH is located is less than or equal to the first time interval, and the first PDSCH carries the first data.

With reference to the second aspect, in some implementations of the second aspect, the method further includes: The network device sends first information to the terminal device, where the first information indicates one or more second time intervals, and each of the second time intervals is a time interval between a time unit in which a downlink shared channel is located and a time unit in which feedback information of the downlink shared channel is located; and the first time interval is equal to a maximum time interval among the one or more second time intervals.

With reference to the second aspect, in some implementations of the second aspect, the method further includes: the network device sends second information to the terminal device, where the second information indicates the first time interval.

With reference to the second aspect, in some implementations of the second aspect, the first data is data for first semi-persistent scheduling, and the second information is downlink control information for activating the first semi-persistent scheduling.

With reference to the second aspect, in some implementations of the second aspect, the first data is data for first semi-persistent scheduling, the second information is carried in first indication information, the first indication information further includes an identifier of a semi-persistent scheduling group, and the first semi-persistent scheduling belongs to the semi-persistent scheduling group.

With reference to the second aspect, in some implementations of the second aspect, the receiving, by the network device, the first feedback information from a terminal device on a second resource in a second time unit includes: The network device receives a first hybrid automatic repeat request HARQ-ACK codebook from the terminal device on the second resource in the second time unit, where the first HARQ-ACK codebook includes the first feedback information.

With reference to the second aspect, in some implementations of the second aspect, the method further includes: The network device receives a second HARQ-ACK codebook from the terminal device on a third resource in the second time unit, where the second HARQ-ACK codebook includes second feedback information, and the second feedback information is feedback information of second data.

With reference to the second aspect, in some implementations of the second aspect, that the network device receives a first HARQ-ACK codebook from the terminal device on the second resource in the second time unit includes: The network device receives the first HARQ-ACK codebook from the terminal device on the second resource in the case that the second resource partially or completely overlaps a third resource and a priority of the first HARQ-ACK codebook is higher than a priority of a second HARQ-ACK codebook, where the third resource carries the second HARQ-ACK codebook including second feedback information, and the second feedback information is feedback information of second data.

With reference to the second aspect, in some implementations of the second aspect, the first data is data for first semi-persistent scheduling, the first HARQ-ACK codebook further includes second feedback information, and the second feedback information is feedback information of second data.

With reference to the second aspect, in some implementations of the second aspect, that the network device receives a first HARQ-ACK codebook from the terminal device on the second resource in the second time unit includes: The network device receives the first HARQ-ACK codebook from the terminal device on the second resource in the case that a third resource partially or completely overlaps a fourth resource and a priority of the second HARQ-ACK codebook is the same as a priority of a third HARQ-ACK codebook. The third resource carries the second HARQ-ACK codebook including the second feedback information, and the second feedback information is feedback information of second data. The fourth resource carries the third HARQ-ACK codebook including the first feedback information, and the first HARQ-ACK codebook includes the first feedback information and the second feedback information.

With reference to the second aspect, in some implementations of the second aspect, the non-uplink resource includes one or more of the following resources: a downlink resource, a flexible resource, or a reserved resource.

According to a third aspect, a communication apparatus is provided, including: a processing unit, configured to determine a first resource in a first time unit, where the first resource carries first feedback information, and the first feedback information is feedback information of first data; and a transceiver unit, configured to send the first feedback information to a network device on a second resource in a second time unit in the case that the first resource includes a non-uplink resource, where the second time unit is a time unit later than the first time unit in time.

With reference to the third aspect, in some implementations of the third aspect, the first resource includes M symbols, a quantity of uplink symbols included in the second time unit is greater than or equal to M, and M is an integer greater than 0.

With reference to the third aspect, in some implementations of the third aspect, the second time unit is a time unit closest to the first time unit in time among one or more third time units; and the first resource includes M symbols, the third time units are time units in which a quantity of uplink symbols is greater than or equal to M, and M is an integer greater than 0, or the third time units are time units including only uplink symbols.

With reference to the third aspect, in some implementations of the third aspect, a time interval between the second time unit and the first time unit is less than or equal to a first time interval; or an interval between the second time unit and a time unit in which a first downlink shared channel PDSCH is located is less than or equal to the first time interval, and the first PDSCH carries the first data.

With reference to the third aspect, in some implementations of the third aspect, the transceiver unit is further configured to receive first information from the network device, where the first information indicates one or more second time intervals, and each of the second time intervals is a time interval between a time unit in which a downlink shared channel is located and a time unit in which feedback information of the downlink shared channel is located; and the first time interval is equal to a maximum time interval among the one or more second time intervals.

With reference to the third aspect, in some implementations of the third aspect, the transceiver unit is further configured to receive second information from the network device, where the second information indicates the first time interval.

With reference to the third aspect, in some implementations of the third aspect, the transceiver unit is further configured to send a first hybrid automatic repeat request HARQ-ACK codebook to the network device on the second resource in the second time unit, where the first HARQ-ACK codebook includes the first feedback information.

With reference to the third aspect, in some implementations of the third aspect, the transceiver unit is further configured to send the first HARQ-ACK codebook to the network device on the second resource in the case that the second resource partially or completely overlaps a third resource and a priority of the first HARQ-ACK codebook is higher than a priority of a second HARQ-ACK codebook, where the third resource carries the second HARQ-ACK codebook including second feedback information, and the second feedback information is feedback information of second data.

With reference to the third aspect, in some implementations of the third aspect, the non-uplink resource includes one or more of the following resources: a downlink resource, a flexible resource, or a reserved resource.

According to a fourth aspect, a communication apparatus is provided, including: a processing unit, configured to determine a first resource in a first time unit, where the first resource carries first feedback information, and the first feedback information is feedback information of first data; and a transceiver unit, configured to receive, by a network device, the first feedback information from a terminal device on a second resource in a second time unit in the case that the first resource includes a non-uplink resource, where the second time unit is a time unit later than the first time unit in time.

With reference to the fourth aspect, in some implementations of the fourth aspect, the first resource includes M symbols, a quantity of uplink symbols included in the second time unit is greater than or equal to M, and M is an integer greater than 0.

With reference to the fourth aspect, in some implementations of the fourth aspect, the second time unit is a time unit closest to the first time unit in time among one or more third time units. The first resource includes M symbols, the third time units are time units in which a quantity of uplink symbols is greater than or equal to M, and M is an integer greater than 0, or the third time units are time units including only uplink symbols.

With reference to the fourth aspect, in some implementations of the fourth aspect, a time interval between the second time unit and the first time unit is less than or equal to a first time interval; or an interval between the second time unit and a time unit in which a first downlink shared channel PDSCH is located is less than or equal to the first time interval, and the first PDSCH carries the first data.

With reference to the fourth aspect, in some implementations of the fourth aspect, the transceiver unit is further configured to send first information to the terminal device, where the first information indicates one or more second time intervals, and each of the second time intervals is a time interval between a time unit in which a downlink shared channel is located and a time unit in which feedback information of the downlink shared channel is located; and the first time interval is equal to a maximum time interval among the one or more second time intervals.

With reference to the fourth aspect, in some implementations of the fourth aspect, the transceiver unit is further configured to send second information to the terminal device, where the second information indicates the first time interval.

With reference to the fourth aspect, in some implementations of the fourth aspect, the transceiver unit is further configured to receive a first hybrid automatic repeat request HARQ-ACK codebook from the terminal device on the second resource in the second time unit, where the first HARQ-ACK codebook includes the first feedback information.

With reference to the fourth aspect, in some implementations of the fourth aspect, the transceiver unit is further configured to receive the first HARQ-ACK codebook from the terminal device on the second resource in the case that the second resource partially or completely overlaps a third resource and a priority of the first HARQ-ACK codebook is higher than a priority of a second HARQ-ACK codebook, where the third resource carries the second HARQ-ACK codebook including second feedback information, and the second feedback information is feedback information of second data.

With reference to the fourth aspect, in some implementations of the fourth aspect, the non-uplink resource includes one or more of the following resources: a downlink resource, a flexible resource, or a reserved resource.

According to a fifth aspect, a communication apparatus is provided, including a processor. The processor is coupled to a memory, and may be configured to execute instructions in the memory to implement the method according to the first aspect and any possible implementation in the first aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip configured in a terminal device. When the communication apparatus is the chip configured in the terminal device, the communication interface may be an input/output interface.

Optionally, the transceiver may be a transceiver circuit. Optionally, the input/output interface may be an input/output circuit.

According to a sixth aspect, a communication apparatus is provided, including a processor. The processor is coupled to a memory, and may be configured to execute instructions in the memory to implement the method according to the second aspect and any possible implementation in the second aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip configured in a network device. When the communication apparatus is the chip configured in the network device, the communication interface may be an input/output interface.

Optionally, the transceiver may be a transceiver circuit. Optionally, the input/output interface may be an input/output circuit.

According to a seventh aspect, a processor is provided, including an input circuit, an output circuit, and a processing circuit. The processing circuit is configured to receive signals via the input circuit and transmit signals via the output circuit, to cause the processor to perform the method according to the first aspect or the second aspect and any possible implementation in the first aspect or the second aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver. A signal output by the output circuit may be output to and transmitted by, for example, but not limited to, a transmitter. The input circuit and the output circuit may be a same circuit, where the circuit is used as the input circuit and the output circuit at different moments. Specific implementations of the processor and the circuits are not limited in embodiments of this application.

According to an eighth aspect, a processing apparatus is provided, including a processor and a memory. The processor is configured to: read an instruction stored in the memory, receive a signal via a receiver, and transmit a signal via a transmitter, to perform the method according to the first aspect or the second aspect and any possible implementation of the first aspect or the second aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read only memory, ROM). The memory and the processor may be integrated into a same chip or may be separately disposed on different chips. A type of the memory and a manner in which the memory and the processor are disposed are not limited in embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eighth aspect may be one or more chips. The processor in the processing apparatus may be implemented by using hardware or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (also referred to as code or an instruction). When executed, the computer program causes a computer to perform the method according to the first aspect or the second aspect and any possible implementation in the first aspect or the second aspect.

According to a tenth aspect, a computer-readable storage medium is provided. The computer-readable storage medium stores a computer program (also referred to as code or an instruction). When running on a computer, the computer program causes the computer to perform the method according to the first aspect or the second aspect and any possible implementation in the first aspect or the second aspect.

According to an eleventh aspect, a communication system is provided, including the foregoing terminal device and network device.

DETAILED DESCRIPTION OF ILLUSTRATIVE EMBODIMENTS

The technical solutions of embodiments of this application are applicable to various communication systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a fifth-generation (5G) communication system, a new radio (NR) access technology, vehicle-to-everything (V2X) communication, Internet of Vehicles, machine type communication (MTC), and Internet of Things (IoT). V2X may include vehicle-to-network (V2N), vehicle-to-vehicle (V2V), vehicle-to-infrastructure (V2I), vehicle-to-pedestrian (V2P), and the like.

Figure 1:
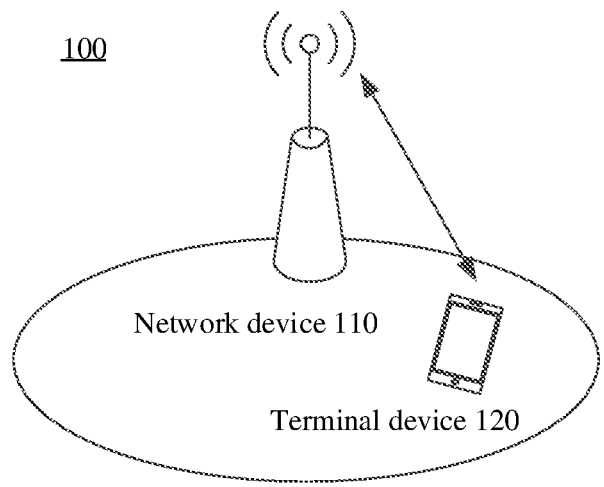
FIG. 1 is a schematic diagram of a wireless communication system 100 to which embodiments of this application are applicable.

FIG. 1 is a schematic diagram of a wireless communication system 100 to which embodiments of this application are applicable.

As shown in FIG. 1, the wireless communication system 100 may include at least one network device, for example, a network device 110 shown in FIG. 1. The wireless communication system 100 may further include at least one terminal device, for example, a terminal device 120 shown in FIG. 1. The network device 110 may send first data to the terminal device 120. The terminal device 120 receives the first data on a PDSCH resource carrying the first data and generates feedback information of the first data, namely, first feedback information. In the case that a first resource carrying the first feedback information includes a non-uplink resource, the terminal device 120 may send the first feedback information to the network device 110 on a second resource. This application is not limited thereto.

The terminal device in embodiments of this application may also be referred to as user equipment (UE), an access terminal, a subscriber unit, a subscriber station, a mobile station, a mobile, a remote station, a remote terminal, a mobile device, a user terminal, a terminal, a wireless communication device, a user agent, or a user apparatus. The terminal device in embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a 5G network, a terminal device in a future evolved public land mobile network (PLMN), or the like.

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. Generalized wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an Internet of Things (IoT) system. IoT is an important part in future development of information technologies. A main technical feature of the IoT is to connect things to a network by using a communication technology, to implement an intelligent network for human-machine interconnection and thing-thing interconnection.

It should be understood that a specific form of the terminal device is not limited in this application.

The network device in embodiments of this application may be any device having a wireless transceiver function. The device includes, but is not limited to: an evolved NodeB (eNB), a radio network controller (RNC), a NodeB (NB), a base station controller (BSC), a base transceiver station (BTS), a home base station (such as a home evolved NodeB or a home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like; or may be gNB or a transmission point (TRP or TP) in a 5G (for example, NR) system, or one antenna panel or a group of antenna panels (including a plurality of antenna panels) of a base station in a 5G system; or may be a network node that constitutes gNB or a transmission point, such as a baseband unit (BBU) or a distributed unit (DU).

In some deployment, the gNB may include a central unit (CU) and the DU. The gNB may further include an active antenna unit (AAU). The CU implements some functions of the gNB, and the DU implements some functions of the gNB. For example, the CU is responsible for processing non-real-time protocols and services, and implements functions of a radio resource control (RRC) layer and a packet data convergence protocol (PDCP) layer. The DU is responsible for processing physical layer protocols and real-time services, and implements functions of a radio link control (RLC) layer, a media access control (MAC) layer, and a physical (PHY) layer. The AAU implements some physical-layer processing functions, and related functions of radio frequency processing and an active antenna. Information at the RRC layer is eventually converted into information at the PHY layer or is converted from information at the PHY layer. Therefore, in this architecture, higher-layer signaling, for example, RRC-layer signaling, may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device serves a cell. The terminal device communicates with the cell by using a transmission resource (such as a frequency domain resource or a frequency spectrum resource) allocated by the network device. The cell may belong to a macro base station (such as a macro eNB or a macro gNB), or may belong to a base station corresponding to a small cell (small cell). The small cell herein may include a metro cell, a micro cell, a pico cell, a femto cell, and the like. These small cells have characteristics of small coverage and low transmit power, and are applicable to providing a high-rate data transmission service.

The following describes definitions involved in this application.

1. Frame Structure

In an LTE system and an NR system, a signal is transmitted through a radio frame. In a time division duplex (TDD) mode, a radio frame may include a downlink resource used for downlink (DL) transmission (that is, the network device sends data, information, or signals) and/or an uplink resource used for uplink (UL) transmission (that is, the terminal device sends data, information, or signals). In other words, the network device and the terminal device send data, information, or signals by using radio resources in different time periods. A radio frame may be further divided into smaller time units such as subframes, slots, and symbols. For example, in a 5G NR communication system, duration of one radio frame is 10 ms, one radio frame includes 10 subframes each with duration of 1 ms, and one slot includes 14 orthogonal frequency division multiplexing (OFDM) symbols for normal cyclic prefix, and includes 12 OFDM symbols for extended cyclic prefix. Because NR supports a plurality of subcarrier spacings, different subcarrier spacings correspond to different OFDM time domain lengths. Therefore, a quantity of slots included in each subframe is related to a subcarrier spacing. For example, in the case of a 15 kHz subcarrier spacing, each subframe includes one slot; or in the case of a 30 kHz subcarrier spacing, each subframe includes two slots.

Uplink resources and downlink resources are divided into uplink symbols and downlink symbols from the perspective of symbols. A flexible frame structure configuration is supported in NR. In other words, an uplink symbol (denoted as U), a downlink symbol (denoted as D), and a flexible symbol (denoted as F) in a slot may be configured or indicated for the terminal device by the network device. The network device may notify the terminal device of the used frame structure in the following three manners.

a. Cell-Specific Configuration

A cell-specific frame structure is configured by using a radio resource control (RRC) message (for example, tdd-UL-DL-ConfigurationCommon). The configuration includes the following content: a quantity of downlink slots, a quantity of downlink symbols after the downlink slots, a quantity of uplink slots at the end, and a quantity of uplink symbols before the uplink slots. If there is another slot or another symbol between the downlink symbol and the uplink symbol, the slot is a flexible slot, and the symbol is a flexible symbol.

b. UE-Specific Configuration

A UE-specific frame structure configuration can rewrite only a flexible slot or a flexible symbol in the cell-specific configuration. A UE-specific RRC message (for example, tdd-UL-DL-ConfigurationDedicated) may be used to indicate an index of a slot to be modified and indicate whether the slot is an uplink slot or a downlink slot, or indicate a quantity of uplink symbols or downlink symbols included in the slot. If there is another slot or another symbol between the downlink symbol and the uplink symbol, the slot is a flexible slot, and the symbol is a flexible symbol.

A downlink symbol configured by the cell-specific configuration and the UE-specific configuration may be referred to as a semi-static downlink symbol, an uplink symbol configured by the cell-specific configuration and the UE-specific configuration may be referred to as a semi-static uplink symbol, and a flexible symbol configured by the cell-specific configuration and the UE-specific configuration may be referred to as a semi-static flexible symbol.

c. Slot Format Indicator (SFI)

The slot format indicator uses a downlink control information (DCI) format 2_0 (DCI format 2_0) for indication. The DCI may indicate formats of one or more slots by indicating one row in a slot format table. The slot format table is configured by RRC signaling. Each row in the slot format table includes one or more slot formats, and each slot format indicates a corresponding format of a slot by indicating a format index (0 to 55) in Table 1. D denotes a downlink symbol, U denotes an uplink symbol, and F denotes a flexible symbol.

A downlink symbol indicated by the SFI may be referred to as a dynamic downlink symbol, an uplink symbol indicated by the SFI may be referred to as a dynamic uplink symbol, and a flexible symbol indicated by the SFI may be referred to as a dynamic flexible symbol.

TABLE 1

| Format | OFDM symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | F | F | F | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U |
| 47 | D | D | F | U | U | U | U | D | F | U | U | U | U | U |
| 48 | D | F | U | U | U | U | D | F | U | U | U | U | U | U |
| 49 | D | D | D | D | F | F | U | D | D | D | F | F | U | U |
| 50 | D | D | F | F | U | U | U | D | D | F | F | U | U | U |

TABLE 1-continued

| Format | OFDM symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |

In addition, when the terminal device receives DCI for data scheduling, and the DCI for data scheduling schedules a physical downlink shared channel (PDSCH), the PDSCH may be referred to as a dynamically scheduled PDSCH. In this case, the dynamically scheduled PDSCH may change a semi-static flexible symbol or a dynamic flexible symbol to a dynamic downlink symbol. For example, if the DCI for data scheduling indicates that a symbol in which the PDSCH is located includes a semi-static flexible symbol, the semi-static flexible symbol is changed to a dynamic downlink symbol by the PDSCH, and the terminal device receives downlink data on the symbol. When a sending location of feedback information for the dynamically scheduled PDSCH is a semi-static or dynamic flexible symbol, the semi-static or dynamic flexible symbol is changed to a dynamic uplink symbol for sending the feedback information. If the DCI schedules a physical uplink shared channel (PUSCH), the PUSCH may change the semi-static or dynamic flexible symbol to a dynamic uplink symbol.

However, for some semi-statically configured transmissions, for example, transmissions with no need of scheduling by DCI, such as a semi-statically configured PDSCH to be sent, or a semi-statically configured PUCCH or PUSCH to be sent, because these transmissions are semi-statically configured, configuration parameters are used for a relatively long time and are not flexible enough, and a resource location cannot be changed at any time, it is inevitable that these semi-static transmission resources overlap semi-static symbols in opposite directions. In this case, to avoid interference, these semi-static transmissions are canceled. For example, if the semi-static PUCCH configured by the network device for UE1 encounters a semi-static downlink symbol or a flexible symbol, UE2 in a same cell (cell) considers that these symbols are used to transmit downlink symbols or can be changed to downlink symbols by an SFI. In this case, UE1 cannot transmit the semi-statically configured PUCCH on these symbols.

2. Feedback Time Interval

In this application, a time interval between two time units is an interval between a start symbol of one time unit and a start symbol of the other time unit, or an interval between an end symbol of one time unit and a start symbol of the other time unit, or an interval between an end symbol of one time unit and an end symbol of the other time unit. Optionally, the interval is specifically a quantity of spaced time units.

The feedback time interval may be denoted as K1. K1 is a quantity of spaced time units between a time unit in which a downlink shared channel is located and a time unit in which feedback information corresponding to the downlink shared channel is located, and may be denoted as PDSCH-to-HARQ_feedback timing, or K1 is a difference between a number of a time unit in which a downlink shared channel is located and a number of a time unit in which feedback information corresponding to the downlink shared channel is located.

For example, in an NR system, the network device configures a K1 set for the terminal device based on configuration information, and the set includes one or more optional values of K1. When the network device sends DCI for data scheduling to the terminal device, an indication field in the DCI indicates a K1 value in the K1 set, to indicate a quantity of spaced time units between a time unit in which a currently scheduled PDSCH is located and a time unit in which feedback information corresponding to the PDSCH is located. The terminal device may determine, based on the DCI for data scheduling, the time unit in which the feedback information corresponding to the PDSCH is located. The time unit may be a slot or a sub-slot. Duration of the sub-slot may be indicated by indication information sent by the network device, for example, the duration may be two symbols or seven symbols. If the DCI for data scheduling indicates that the network device sends downlink data on a PDSCH in a slot n, that is, an end symbol of the PDSCH is in the slot n, and the DCI indicates K1=4, after receiving the DCI, the terminal device may determine that the network device indicates the terminal device to send, in a slot n+4, feedback information corresponding to the PDSCH.

3. Configuration Information

The configuration in this application means that the network device sends an indication of configuration information to the terminal device. The configuration information may be carried in higher-layer signaling. The higher-layer signaling is signaling sent from a higher-layer protocol layer. The higher-layer protocol layer is at least one protocol layer above a physical layer. The higher-layer protocol layer may specifically include at least one of the following protocol layers: a medium access control (MAC) layer, a radio link control (RLC) layer, a packet data convergence protocol (PDCP) layer, a radio resource control (RRC) layer, or a non-access stratum (NAS).

4. Semi-Persistent Scheduling (SPS)

Semi-persistent scheduling means that the network device notifies the terminal device of a periodic downlink resource via configuration information. After the network device activates the periodic downlink resource by DCI, the terminal device receives data from the network device on a downlink resource in each period, and the network device does not need to send DCI before a downlink resource in each period to schedule the downlink resource. This can reduce resource overheads of a physical downlink control channel (PDCCH). As a first SPS PDSCH is scheduled by activating DCI, a first PDSCH is also dynamically scheduled, and subsequently a PDSCH in each period is determined based on its period and the first PDSCH. Therefore, the subsequent PDSCH is considered as a PDSCH without scheduling information or a semi-persistently scheduled PDSCH, namely, a PDSCH by SPS (referred to as SPS PDSCH).

For example, in an NR system, a maximum of eight groups of semi-persistent scheduling parameters may be configured for one terminal device. The network device configures an identifier (denoted as an SPS ID), a period, and a modulation and coding scheme of each group of semi-persistent scheduling parameters for the terminal device via configuration information. The network device may further configure a group of uniform physical uplink control channel (PUCCH) resources for a plurality of groups of semi-persistent scheduling parameters. The PUCCH resources configured via the configuration information carry feedback information of a hybrid automatic repeat request (HARQ) of one or more groups of semi-persistently scheduled PDSCHs (namely, SPS PDSCHs).

The network device activates, by activating DCI, a group of parameters in the configured SPS resource. The activated DCI indicates a slot in which a first PDSCH of the SPS is located, a specific location of the first PDSCH in the slot, and a corresponding K1 parameter, to determine a slot in which each SPS PDSCH feedback information corresponding to the group of semi-persistent scheduling parameters is located.

Specifically, the activated DCI indicates a specific location of the first PDSCH of the SPS through an index value in a time domain resource table (as shown in the following Table 2), where K0 indicates a quantity of slots between a slot in which the activated DCI is located and a slot in which the SPS PDSCH is located, S in (S, L) indicates a symbol number of a start symbol of the SPS PDSCH in a slot, and L indicates a quantity of consecutive symbols of the PDSCH.

TABLE 2

| Index | $K_O$ | (S, L) |
|---|---|---|
| 0 | 1 | (2, 4) |
| 1 | 1 | (1, 2) |
| 2 | 2 | (3, 4) |
| 3 | 2 | (0, 7) |

For example, the activated DCI indicates an index 1 in Table 2, where K0=1 indicates that a quantity of slots between a slot in which the first PDSCH of the SPS is located and a slot n in which the activated DCI is located is 1, then the SPS PDSCH is in a slot n+1; and (S,L)=(1,2) indicates that a start symbol of the SPS PDSCH is a symbol 1 in the slot n+1 and lasts for two symbols, then the SPS PDSCH occupies the symbol 1 and a symbol 2 in the slot n+1 in time domain. The terminal device may determine, based on the period that is of the SPS resource and that is configured in the configuration information, a location of a PDSCH in each period of the SPS. The location of the PDSCH in each period of the SPS is the same as a location of a first PDSCH in a first period of the SPS.

In addition, the activated DCI gives, by indicating a value of K1 in a K1 set, a notification of a slot in which feedback information of an SPS PDSCH is located. The K1 set may be specified in a protocol or configured by the network device for the terminal device. K1 indicates a quantity of slots between a slot in which the feedback information of the SPS PDSCH is located and a slot in which the SPS PDSCH is located. For example, if the activated DCI indicates K1=4, the SPS PDSCH is in a slot n+1, and in this case, the feedback information of the SPS PDSCH is in a slot n+5.

After a time unit in which the feedback information of the SPS PDSCH is located is determined by the terminal device, the terminal device may generate a HARQ-ACK codebook in the time unit in the following manner, and then determine a PUCCH resource for sending the feedback information in the time unit.

It should be noted that, in embodiments of this application, the HARQ-ACK codebook is feedback information bits generated by jointly encoding ACK and NACK that need to be fed back in a time unit.

(1) If feedback information of only a semi-persistently scheduled PDSCH needs to be fed back in the time unit, a codebook is generated in the following manner.

First, a quantity of bits of an SPS PDSCH that needs to be fed back is determined. Specifically, feedback information of all SPS PDSCHs that need to be fed back in the time unit may be connected in series in the following sorting manner: The feedback information is sorted based on a cell identifier (cell ID) sequence, and in each cell, sorted based on SPS IDs in ascending order; and for each SPS ID, sorted based on time domain locations in which SPS PDSCHs are located from front to back.

After the HARQ-ACK codebook is determined, the PUCCH resource is determined in the following manner.

In a PUCCH resource pool (also referred to as a PUCCH resource set) configured by the network device for the terminal device, a PUCCH resource is selected based on a quantity of bits of the feedback information, to transmit the feedback information of the SPS PDSCH. For example, the network device configures four PUCCH resources for the terminal device. If the quantity of bits of the feedback information is less than or equal to 2, the first PUCCH resource is used. If the quantity of bits ranges from 3 to N1, the second PUCCH resource is used. If the quantity of bits ranges from N1 to N2, the third PUCCH resource is used. If the quantity of bits ranges from N2 to N3, the fourth PUCCH resource is used. N1, N2, and N3 are also indicated by the configuration information sent by the network device. If there is no indication, a default value 1706 is used.

(2) If feedback information of a dynamically scheduled PDSCH also needs to be fed back in the time unit, a codebook is generated in the manner of generating a HARQ-ACK feedback information codebook in the related art.

For example, in NR, the HARQ-ACK codebook may be determined in a semi-static codebook mode or in a dynamic codebook mode.

1. A dynamic codebook is also referred to as a type 2 HARQ codebook. The terminal device detects a PDCCH on each downlink control channel (PDCCH) monitoring occasion, determines, based on time domain resource allocation indication information and PDSCH-to-HARQ-timing indication information in the PDCCH, in which time unit a PDSCH scheduled by the detected PDCCH is transmitted, and determines in which time unit corresponding ACK/NACK is fed back. If there is feedback information for semi-persistent scheduling in the time unit, all feedback information that needs to be sent in the time unit is connected in series, and then added after dynamic feedback information to form a HARQ-ACK codebook, where for the connection manner of the feedback information, refer to the description in (1).

2. A semi-static codebook is also referred to as a type 1 HARQ codebook. The terminal device detects a PDSCH on each downlink control channel (PDCCH) monitoring occasion, determines, based on time domain resource allocation indication information and PDSCH-to-HARQ-timing indication information (a corresponding indication value may be referred to as K1) in the PDCCH, in which time unit a PDSCH scheduled by the detected PDCCH is transmitted, and determines in which time unit corresponding ACK/

NACK is fed back. An HARQ-ACK codebook generated in a feedback time unit includes not only feedback information of a scheduled PDSCH, but also feedback information of all candidate time units in a PDSCH-to-HARQ-timing set, namely a K1 set, configured based on higher-layer signaling. If there is no data in a corresponding candidate time unit, NACK is filled in a corresponding feedback bit.

For example, the type 1 HARQ codebook or type 2 HARQ codebook in an NR system may be used for generating. For specific implementation, refer to the related art. However, this application is not limited thereto.

After the HARQ-ACK codebook is determined, the PUCCH is determined in the following manner.

The terminal device determines, based on a total quantity of bits of feedback information of a dynamically scheduled PDSCH and feedback information of a semi-persistently scheduled PDSCH (for example, including N pieces of feedback information in total) that need to be fed back in the time unit, one PUCCH resource set from a plurality of PUCCH resource sets configured by the network device, and then determines, based on resource indication information in the last piece of DCI (that is, the piece of DCI received at the latest time) from multiple pieces of DCI corresponding to the N pieces of feedback information, a PUCCH resource that is in the PUCCH resource set and that carries the N pieces of feedback information. However, this application is not limited thereto.

For dynamically scheduled data, each piece of DCI indicates a priority of feedback information corresponding to a PDSCH scheduled by the DCI. For example, the DCI includes 1 bit, to indicate a high priority or a low priority. In a time unit, a HARQ-ACK codebook is generated from high-priority feedback information together, and a priority of the HARQ-ACK codebook is a priority of feedback information of the codebook. For example, if DCI 1 indicates that feedback information 1 of PDSCH 1 is in a slot n and has a high priority, and DCI 2 indicates that feedback information 2 of PDSCH 2 is in the slot n and also has a high priority, a HARQ-ACK codebook that is generated in the slot n and that includes the feedback information 1 and the feedback information 2 has a high priority. For semi-persistently scheduled data, configuration parameters include a priority indication corresponding to an SPS parameter group. Once the SPS parameter group is activated, a priority corresponding to the SPS parameter group is a priority indicated by the priority indication in the configuration parameters.

In a communication process, it is inevitable that a conflict occurs between a plurality of instructions sequentially sent by the network device. For example, the network device configures and activates an SPS resource for the terminal device, and the terminal device receives downlink data on the SPS resource based on SPS configuration information and the activated DCI, and sends feedback information corresponding to the downlink data on a corresponding PUCCH resource. As one group of SPS parameters have only one value of K1 indicated by an activated DCI, subsequently a time unit in which feedback information of an SPS PDSCH in each period is located needs to be determined based on the value of Ku indicated by the activated DCI. Therefore, it is inevitable that the time unit in which the feedback information is located or the PUCCH resource carrying the feedback information includes a semi-static downlink symbol or a semi-static flexible downlink symbol. Alternatively, the network device rewrites a frame structure by using an SFI due to some service requirements (for example, an ultra-reliable and low-latency communications (URLLC) service), where a PUCCH resource used to send feedback information of an SPS PDSCH is rewritten by the SFI into a downlink resource or a flexible resource. In these two cases, if the terminal device still sends the feedback information on the resource based on the SPS configuration, downlink information sent by the network device on the resource cannot be received by the terminal device, and the feedback information from the terminal device cannot be received by the network device because the network device is in a sending state. As a result, a waste of resources is caused. Alternatively, the network device may need to send the downlink information to another UE on the resource, and the feedback information causes interference to a signal of the another UE carried on the rewritten resource. However, if the terminal device does not perform a sending operation on the flexible resource or the downlink resource, the terminal device cannot feed back the feedback information of the PDSCH. Consequently, the network device cannot determine whether the SPS PDSCH is successfully received, and then retransmits the SPS PDSCH. This also causes a waste of resources, causes an unnecessary communication delay, and reduces communication quality.

This application provides an information transmission method. When a first resource carrying feedback information of first data includes a non-uplink resource, a terminal device sends the feedback information on a second resource. The second resource is an uplink resource after the first resource. In this case, a waste of communication resources can be reduced and the communication quality can be improved.

The information transmission method provided in embodiments of this application is described below in detail with reference to the accompanying drawings.

Figure 2:
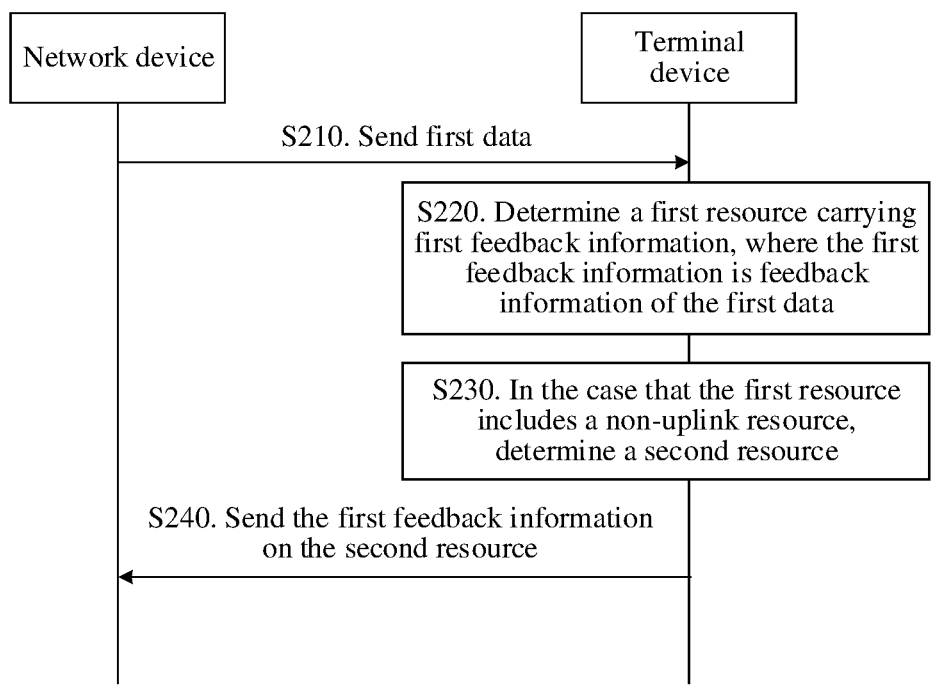
FIG. 2 is a schematic flowchart of an information transmission method according to this application.

FIG. 2 is a schematic flowchart of an information transmission method according to this application.

S210. A network device sends first data to a terminal device.

Correspondingly, the terminal device receives the first data from the network device. The first data is carried on a first PDSCH, and the terminal device receives the first data on the first PDSCH.

Optionally, the first data is data of first SPS, the first PDSCH is a resource carrying the data of the first SPS, and the terminal device receives the first data on the first PDSCH. In other words, the first PDSCH is an SPS PDSCH.

For example, before S210, the network device sends first configuration information to the terminal device, where the first configuration information is used to configure parameters of the first SPS. The network device further sends, to the terminal device, first DCI for activating the parameters of the first SPS. After receiving the first DCI, the terminal device determines that the parameters of the first SPS are activated. The terminal device determines, based on the first DCI and the first configuration information, a PDSCH in each period of the first SPS, and a time unit that is corresponding to each PDSCH and that carries feedback information, namely, a first time unit. In S210, the terminal device receives the first data on a PDSCH in one period of the first SPS. However, this application is not limited thereto.

Optionally, the first data is dynamically scheduled data.

For example, before S210, the network device sends second DCI to the terminal device, where the second DCI includes a plurality of indication fields that respectively indicate a first PDSCH carrying first data, a first time unit carrying feedback information of first data, and the like. After the terminal device receives the second DCI from the network device, in S210, the terminal device receives the first data on the first PDSCH. However, this application is not limited thereto.

S220. The terminal device determines a first resource carrying first feedback information, where the first feedback information is feedback information of the first data.

The terminal device receives the first data on the first PDSCH, and generates the first feedback information based on whether the first data is successfully received.

For example, when the terminal device successfully receives the first data, the first feedback information is acknowledgment (ACK) information; or when the terminal device fails to receive the first data, the first feedback information is negative acknowledgment (NACK). However, this application is not limited thereto. In S220, the terminal device determines the first resource carrying the first feedback information, where the first resource is a resource in a first time unit.

In this embodiment of this application, that a resource is in a time unit means that a start symbol of the resource in time domain is not earlier than a start symbol of the time unit, and an end symbol of the resource is not later than an end symbol of the time unit.

Optionally, the first data is data of first SPS, and the terminal device determines, based on the first configuration information and/or the first DCI, the first resource carrying the first feedback information.

Optionally, the first data is dynamically scheduled data, and the terminal device determines the first resource by scheduling the second DCI.

As an example rather than a limitation, the first resource is a PUCCH resource.

Optionally, in the first time unit determined in step S210, a HARQ-ACK codebook may be generated in the foregoing manner of generating a HARQ-ACK codebook in a time unit in which feedback information is located, and then the first resource is determined in the foregoing manner of determining a PUCCH in a time unit in which feedback information is located. The HARQ-ACK codebook includes the first feedback information.

S230. In the case that the first resource includes a non-uplink resource, the terminal device determines a second resource in a second time unit.

The terminal device may determine, based on a frame structure configuration, whether the first resource includes a non-uplink resource. For example, the first resource includes a resource of M OFDM symbols in time, where M is an integer greater than 0. If all the M OFDM symbols are uplink OFDM symbols, the first resource is an uplink resource. If not all the M OFDM symbols are uplink OFDM symbols, the first resource includes a non-uplink resource.

As an example rather than a limitation, that the first resource includes a non-uplink resource means that the first resource overlaps the non-uplink resource in time domain.

As an example rather than a limitation, the uplink resource is a semi-static uplink symbol, a semi-static uplink slot, a dynamic uplink symbol, or a dynamic uplink slot.

As an example rather than a limitation, the non-uplink resource is a resource that is not an uplink resource, and may include one or more of the following resources: a downlink resource, a flexible resource, or a reserved resource.

Optionally, the downlink resource may include a semi-static downlink symbol configured by a cell-specific configuration or a UE-specific configuration, and the downlink resource may further include a dynamic downlink symbol indicated by an SFI or a dynamic downlink symbol changed by dynamically scheduled data.

Optionally, the flexible resource may include a semi-static flexible symbol configured by a cell-specific configuration or a UE-specific configuration, and may also include a dynamic flexible symbol indicated by an SFI.

Optionally, a reserved resource may be a resource reserved by a system. Specifically, the network device may configure the reserved resource.

Figure 3:
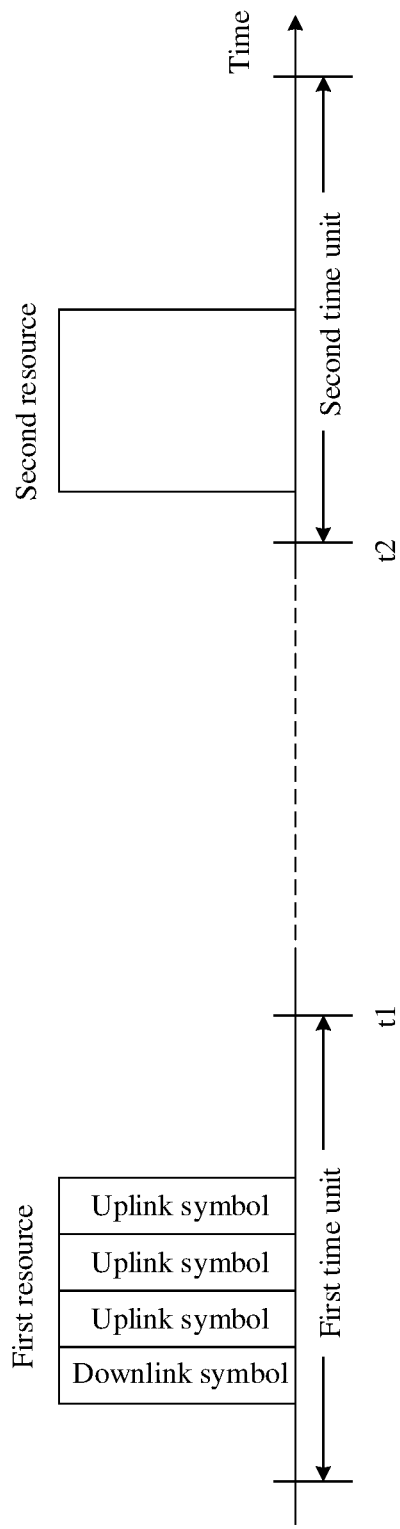
FIG. 3 is a schematic diagram of an information transmission method according to this application.

For example, as shown in FIG. 3, after the terminal device determines the first resource that carries the first feedback information and that is in the first time unit, the first resource includes four OFDM symbols, and the first symbol in the four OFDM symbols is a downlink symbol. In an example, the downlink symbol may be a semi-static downlink symbol, the first data is data of the first SPS, and the first resource carrying the feedback information of the first data (namely, the first feedback information) includes the semi-static downlink symbol, then the terminal device determines the second resource used to send the first feedback information. In another example, the downlink symbol may be a dynamic downlink symbol. After the terminal device receives the first DCI for activating the first SPS or the second DCI used to schedule the first data, the network device sends an SFI indication. The SFI indication indicates that a first symbol in the first resource is a dynamic downlink symbol. In this case, the terminal device determines the second resource used to send the first feedback information. However, this application is not limited thereto.

When the first resource includes an uplink resource, the terminal device sends the first feedback information on the first resource. When the first resource includes a non-uplink resource, the terminal device determines the second resource in the second time unit in S230, and sends the first feedback information on the second resource in S240. The second time unit is a time unit later than the first time unit in time. In other words, a start moment of the second time unit is later than an end moment of the first time unit. As shown in FIG. 3, a start moment t2 of the second time unit is later than an end moment t1 of the first time unit in time.

It should be noted that in this application, a time unit (or resource) is later than another time unit (or resource) in time, that is, a start symbol of a time unit in time domain is later than a start symbol of another time unit, or an end symbol of a time unit in time domain is later than an end symbol of another time unit, or a start symbol of a time unit in time domain is later than an end symbol of another time unit. In this case, the time unit (or resource) may be referred to as a time unit after the another time unit (or resource).

Optionally, the first resource includes M symbols, a quantity of uplink symbols included in the second time unit is greater than or equal to M, and M is an integer greater than 0.

To determine the second resource, the terminal device first determines the second time unit from time units after the first time unit. The following specifically describes how to determine the second time unit.

Optionally, the second time unit is a time unit that meets one or more of the following conditions.

Condition 1: A quantity of uplink symbols included in the second time unit is greater than or equal to M, in other words, the second time unit includes at least M uplink symbols. To be specific, the second time unit is a time unit that is after the first time unit and that includes a quantity of uplink symbols greater than or equal to M.

Condition 2: The second time unit is a time unit closest (in other words, closest in time) to the first time unit in time among one or more third time units. The third time units are time units that are after the first time unit and that include a quantity of uplink symbols greater than or equal to M. That is, the second time unit is a time unit that is the first after the first time unit and includes a quantity of uplink symbols not less than M.

Condition 3: The second time unit is a time unit closest (in other words, closest in time) to the first time unit in time among one or more third time units. The third time units are time units including only uplink symbols (which may be referred to as uplink time units). That is, the second time unit is the first uplink time unit after the first time unit.

Condition 4: All uplink symbols included in the second time unit are semi-static uplink symbols.

As an example rather than a limitation, the time unit in this application may be one of the following time units: a sub-slot, a mini-slot, a slot, a subframe or frame, or a symbol.

The time unit includes but is not limited to a first time unit, a second time unit, and a third time unit.

Figure 4:
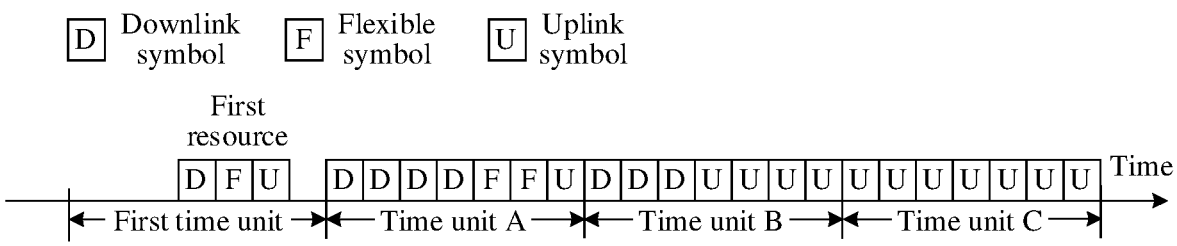
FIG. 4 is another schematic diagram of an information transmission method according to this application.

For example, the second time unit is a time unit closest to the first time unit among time units that include a quantity of uplink symbols greater than or equal to M and that are after the first time unit. As shown in FIG. 4, the first resource in the first time unit includes three symbols. In the first resource, the first symbol is a downlink symbol, and the second symbol is a flexible symbol. In other words, the first resource includes two non-uplink symbols. In this case, the first resource cannot be used to send the first feedback information. The terminal device needs to determine the second resource. The terminal device first determines the second time unit in which the second resource is located. After the first time unit, a time unit that is closest to the first time unit and that includes at least three uplink symbols is the second time unit. In FIG. 4, a time unit A after the first time unit includes only one uplink symbol, and therefore the time unit A does not meet the condition. A time unit B includes four uplink symbols, and therefore the time unit B meets the condition. The terminal device determines the time unit B as the second time unit. However, this application is not limited thereto.

In another example, the second time unit is a time unit that is after the first time unit and that includes only uplink symbols. As shown in FIG. 4, the first resource in the first time unit includes three symbols and includes non-uplink resources, and therefore the terminal device cannot send the first feedback information on the first resource. The terminal device determines a time unit that is after the first time unit and that is closest to the first time unit and that includes only uplink symbols, as the second time unit. In FIG. 4, a time unit C meets the condition, and therefore the terminal device determines the time unit C as a time unit in which the second resource is located. However, this application is not limited thereto.

Condition 5: An interval between the second time unit and the first time unit is less than or equal to a first time interval.

For example, the second time unit needs to meet the condition 1 and the condition 5. The terminal device determines the second time unit based on the condition 1 and the condition 5. The second time unit is after the first time unit, has an interval less than or equal to the first time interval from the first time unit, and includes a quantity of uplink symbols not less than M.

For example, the second time unit needs to meet the condition 2 and the condition 5. The terminal device determines the second time unit based on the condition 2 and the condition 5. The second time unit is a third time unit that is after the first time unit and that is closest to the first time unit in the first time interval.

For example, the second time unit needs to meet the condition 3 and the condition 5. The terminal device determines the second time unit based on the condition 3 and the condition 5. The second time unit is a first uplink time unit in the first time interval after the first time unit.

Condition 6: A time interval between the second time unit and a time unit in which the first PDSCH is located is less than or equal to a first time interval.

For example, the second time unit needs to meet the condition 1 and the condition 6. The terminal device determines the second time unit based on the condition 1 and the condition 6. The second time unit is after the first time unit, has an interval less than or equal to the first time interval from the time unit in which the first PDSCH is located, and includes a quantity of uplink symbols not less than M.

For example, the second time unit needs to meet the condition 2 and the condition 6. The terminal device determines the second time unit based on the condition 2 and the condition 6. The second time unit is a third time unit that is closest to the first time unit in the first time interval from the time unit in which the first PDSCH is located and that is after the first time unit.

For example, the second time unit needs to meet the condition 3 and the condition 6. The terminal device determines the second time unit based on the condition 3 and the condition 6. The second time unit is a first uplink time unit that is after the first time unit and that is in the first time interval from the time unit in which the first PDSCH is located.

In the condition 5 and the condition 6, the terminal device may determine the first time interval in, but not limited to, the following manners.

Manner 1: The first time interval is specified in a protocol or preset by a system.

The first time interval is specified in a protocol or preset by a system. When the first feedback information cannot be sent on the first resource, an interval between the second time unit for sending the first feedback information and the first time unit or between the second time unit for sending the first feedback information and the time unit in which the first PDSCH is located is less than or equal to the first time interval. For example, the first time interval specified in a protocol or preset by a system is five time units, the third time unit is a time unit including a quantity of uplink symbols not less than M, and the second time unit is after the first time unit, is closest to the first time unit in the five time units, and includes a quantity of uplink symbols not less than M. Optionally, when there is no third time unit in the five time units after the first time unit, the terminal device does not send the first feedback information. However, this application is not limited thereto.

In another example, the second time unit is a time unit that is after the first time unit and that has the first time interval from the first time unit. The first time interval specified in a protocol or preset in a system is four time units. When the first time unit is a time unit n, and the first resource in the first time unit includes a non-uplink resource and therefore cannot carry the first feedback information, the terminal device determines that the second time unit in which the second resource is located is a time unit n+4.

Optionally, when a quantity of uplink symbols included in the time unit n+4 is less than M, the terminal device does not send the first feedback information. However, this application is not limited thereto.

Manner 2: The network device sends first information to the terminal device, where the first information indicates one or more second time intervals, and the second time interval is a time interval between a time unit in which a PDSCH is located and a time unit in which feedback information corresponding to the PDSCH is located. The first time interval is equal to a maximum time interval among the one or more second time intervals, or the first time interval is a maximum time interval among the one or more second time intervals. Optionally, the first information may be a radio resource control (RRC) message.

For example, the second time unit is a time unit that is after the first time unit and that has a first time interval from the first time unit. The network device configures a second time interval set for the terminal device through the first information. The second time interval set includes one or more second time intervals. For example, the second time interval set may be a K1 set configured in the NR system. A maximum interval among the one or more second time intervals is five time units. When the first resource in a time unit n (to be specific, the first time unit is the time unit n) includes a non-uplink resource and the first feedback information cannot be sent on the first resource, the terminal device determines that a time unit n+5 after the time unit n is the second time unit. Optionally, when a quantity of uplink symbols included in the time unit n+5 is less than M, the terminal device does not send the first feedback information. However, this application is not limited thereto.

Figure 5:
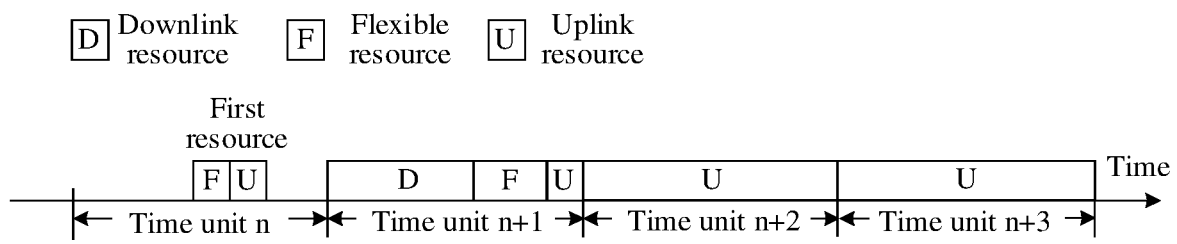
FIG. 5 is another schematic diagram of an information transmission method according to this application.

In another example, the second time unit is an uplink time unit that is closest to the first time unit in the first time interval and that is after the first time unit. For example, as shown in FIG. 5, the first feedback information cannot be sent on the first resource because the first resource in the time unit n includes a flexible symbol, and a maximum time interval among the one or more second time intervals configured by the network device for the terminal device is three time units. The terminal device determines, from the three time units after the first time unit: time units n+1, n+2, and n+3, an uplink time unit closest to the first time unit as the second time unit. The three time units include two uplink time units: time units n+2 and n+3. The time unit n+2 that is closest to the first time unit is the second time unit. However, this application is not limited thereto.

Manner 3: The network device sends second information to the terminal device, where the second information indicates the first time interval.

In an embodiment, the second information may directly indicate the first time interval.

For example, if a unit of the first time interval is a slot, a value indicated by the second information indicates a quantity of slots included in the first time interval. If the second information indicates 2, it indicates that the first time interval includes two slots. However, this application is not limited thereto.

In another embodiment, the second information may indicate an index value, and a time interval corresponding to the index value is a first time interval. For example, the second information indicates a K1 value in the foregoing K1 set, and each K1 value in the K1 set corresponds to an index value. If the second information indicates an index value 0, and the K1 value corresponding to the index value 0 in the K1 set is 3, it indicates that the first time interval includes three time units. However, this application is not limited thereto.

Optionally, the second information is carried in an RRC message, or the second information is carried in first DCI used to activate parameters of the first SPS, or the second information is carried in second DCI used to schedule the first data.

For example, in the first DCI for activating the parameters of the first SPS, indication information indicating K1 does not indicate a time unit in which feedback information is actually sent, but indicates the first time interval.

Condition 7: A time interval between the second time unit and a time unit in which the first PDSCH is located is greater than or equal to a fourth time interval.

Optionally, the fourth time interval is a PDSCH processing procedure time length (UE PDSCH processing procedure time) defined in a protocol, and the PDSCH processing procedure time length is determined based on a PDSCH decoding time N1. Different subcarrier spacings of PDSCHs and different capabilities correspond to different N1. Specifically, N1 may be shown in Table 3 or Table 4. $\mu=0, 1, 2$, and 3 respectively indicate that subcarrier spacings are 15 kHz, 30 kHz, 60 kHz, and 120 kHz. A specific capability supported by the UE is reported by the UE to the network device.

TABLE 3

| | $N_1$ [symbol] | |
| --- | --- | --- |
| µ | Case 1 | Case 2 |
| 0 | 8 | $N_{1,0}$ |
| 1 | 10 | 13 |
| 2 | 17 | 20 |
| 3 | 20 | 24 |

TABLE 4

| µ | $N_1$ [symbol] |
| --- | --- |
| 0 | 3 |
| 1 | 4.5 |
| 2 | 9 (corresponding to the frequency domain range 1) |

For example, the second time unit needs to meet the condition 1 and the condition 7. The terminal device determines the second time unit based on the condition 1 and the condition 7. The second time unit is after the first time unit, has an interval less than or equal to the first time interval and greater than or equal to the fourth time interval from the time unit in which the first PDSCH is located, and includes a quantity of uplink symbols not less than M.

Condition 8: A time interval between the second time unit and a time unit in which the first PDSCH is located is a second time interval.

The second time interval is determined in the following manner: The network device sends first information to the terminal device, where the first information indicates one or more second time intervals, and the second time interval is a time interval between a time unit in which a PDSCH is located and a time unit in which feedback information corresponding to the PDSCH is located.

Optionally, the second time interval is a feedback time interval, and the one or more second time intervals are denoted as one or more K1 values in a K1 set.

For example, the second time unit needs to meet the condition 5 and the condition 8. The terminal device determines the second time unit based on the condition 5 and the condition 8. An interval between the second time unit and a time unit in which the first PDSCH is located is less than or equal to the first time interval and is the second time interval.

For example, in the condition 5, the first time interval is determined in Manner 2. The network device configures a second time interval set for the terminal device through the first information. The second time interval set includes one or more second time intervals. For example, the second time interval set may be a K1 set {1, 3, 5} configured in the NR system. The one or more second time intervals include one, three, or five time units, and a maximum value is five time units. When the first resource in a time unit n (to be specific, the first time unit is the time unit n) includes a non-uplink resource and the first feedback information cannot be sent on the first resource, the terminal device determines that after the time unit n and within a time unit n+5, a time unit n+1, a time unit n+3, or the time unit n+5 is the second time unit.

Optionally, further with reference to the condition 1, when a quantity of uplink symbols included in the three time units is less than M, the terminal device does not send the first feedback information. However, this application is not limited thereto.

Optionally, the network device sends third information to the terminal device, where the third information indicates the second time unit. The terminal device determines the second time unit based on the third information.

Optionally, the third information is carried in first indication information, the first indication information further includes an identifier of an SPS group, and the first SPS belongs to the SPS group.

For example, the network device indicates, in the first configuration information for configuring the parameters of the first SPS or in the first DCI for activating the parameters of the first SPS, the SPS group to which the first SPS belongs. After receiving the first indication information from the network device, the terminal device determines, based on the identifier of the SPS group in the first indication information, that the first indication information indicates related information of the SPS group, where the third information in the first indication information indicates a location of the second time unit. A specific indication manner is the same as a manner of indicating the feedback time unit by the activated DCI. When the first resource includes a non-uplink resource and the first feedback information cannot be sent on the first resource, the terminal device determines the second time unit based on the third information included in the first indication information. However, this application is not limited thereto.

After determining the second time unit, the terminal device determines, in the second time unit, a second resource for sending the first feedback information. The terminal device may determine the second resource in but is not limited to one of the following manners.

Manner 1: An HARQ-ACK codebook in the second time unit is generated in the foregoing manner of generating the HARQ-ACK codebook in the time unit in which the feedback information is located, and a PUCCH resource in the second time unit is determined as the second resource.

In a possible implementation, the terminal device determines that a total of N pieces of feedback information need to be sent in the first time unit, and the terminal device generates a codebook based on the N pieces of feedback information and determines the second resource based on last received scheduling information from scheduling information corresponding to the determined N pieces of feedback information.

For example, if the terminal device determines that a total of three pieces of feedback information need to be sent in the first time unit, the terminal device selects one PUCCH resource set from a plurality of configured PUCCH resource sets. The terminal device determines that last received scheduling information from scheduling DCI corresponding to the three pieces of feedback information is DCI A, where the DCI A indicates one PUCCH resource in the PUCCH set, the PUCCH set includes four PUCCHs, and each of the four PUCCHs corresponds to a bit quantity range of one piece of feedback information, for example, a PUCCH 1 corresponds to bits 3 to N1, a PUCCH 2 corresponds to bits N1 to N2, and a PUCCH 3 corresponds to a quantity of bits greater than N2. The terminal device calculates a total quantity M of bits of the three pieces of feedback information, and determines that N1<M<N2, corresponding to the PUCCH 2. In this case, after determining the second time unit, the terminal device sends the first feedback information on the PUCCH 2 (namely, the second resource) in the second time unit. However, this application is not limited thereto.

Optionally, the terminal device may generate a first HARQ-ACK codebook based on the N pieces of feedback information.

The first HARQ-ACK codebook may be generated in a manner of generating a HARQ feedback information codebook in the related art. For example, a type 1 HARQ codebook or a type 2 HARQ codebook in an NR system may be used for generating. For specific implementation, refer to the related art. However, this application is not limited thereto.

In another possible implementation, the N pieces of feedback information are feedback information corresponding to data of N SPSs, and the N SPSs include a first SPS.

For example, the terminal device needs to send, in the first time unit, the feedback information corresponding to the data of N SPSs. The terminal device may determine the second resource based on a quantity of bits of the N pieces of feedback information. For example, the network device indicates a PUCCH set for the terminal device, and a PUCCH corresponding to a total quantity of bits of the N pieces of feedback information in the PUCCH set is a PUCCH B. After determining the second time unit, the terminal device sends the N pieces of feedback information on the PUCCH B in the second time unit. However, this application is not limited thereto.

Optionally, the terminal device may generate a first HARQ-ACK codebook based on the N pieces of feedback information.

The first HARQ-ACK codebook may be formed by connecting the N pieces of feedback information in series. The N pieces of feedback information in the first HARQ-ACK codebook may be arranged based on cell identifiers corresponding to the feedback information in ascending order, in each cell, arranged based on SPS identifiers in ascending order, and for each SPS, arranged based on time domain occurrence from front to back. However, this application is not limited thereto.

After the terminal device determines the second resource in Manner 1, in S240, the terminal device sends the first feedback information on the second resource.

Optionally, the terminal device may send a first HARQ-ACK codebook on the second resource, where the first HARQ-ACK codebook includes the first feedback information.

Manner 2: A time-frequency location of the second resource in the second time unit is the same as a time-frequency location of the first resource in the first time unit. The second resource is used to send a first HARQ-ACK codebook.

A manner of determining the first HARQ-ACK codebook is the same as that in Manner 1. Details are not described again.

For example, the terminal device determines that the PUCCH 1 (namely, the first resource) in the first time unit is used to send the first HARQ-ACK codebook. When the PUCCH 1 includes a non-uplink symbol, the terminal device determines a second time unit and sends the first feedback information on the PUCCH 1 in the second time unit. However, this application is not limited thereto.

Optionally, the terminal device further determines a third resource in the second time unit, where the third resource is used to send a second HARQ-ACK codebook, the second HARQ-ACK codebook includes second feedback information, and the second feedback information is feedback information of second data.

The second HARQ-ACK codebook is a HARQ-ACK codebook that needs to be sent in the second time unit and that is determined by the terminal device based on a time sequence relationship between data and feedback information of the data. Specifically, for a manner of determining the second HARQ-ACK codebook and a manner of determining the third resource, refer to the foregoing manner of determining the HARQ-ACK codebook and the foregoing manner of determining the PUCCH resource in the time unit in which the feedback information is located. Details are not described again.

For example, the network device indicates, through dynamic scheduling DCI, SPS configuration information, or SPS activation DCI, that the feedback information of the second data is carried in the second time unit, and determines that the second feedback information needs to be sent on the third resource. In this case, in addition to sending the first feedback information on the second resource in the second time unit, the terminal device further sends the second HARQ-ACK codebook on the third resource in the second time unit, where the second HARQ-ACK codebook includes the second feedback information.

Optionally, in the case that the second resource partially or completely overlaps the third resource, and a priority of the first HARQ-ACK codebook is higher than that of the second HARQ-ACK codebook, the terminal device sends the first HARQ-ACK codebook on the second resource in S240. The second HARQ-ACK codebook includes second feedback information, and the second feedback information is feedback information of second data. Optionally, the terminal device cancels sending the second HARQ-ACK codebook on the third resource. In this application, that two resources overlap means that the two resources occupy (or include) a same time domain symbol.

When the second resource carrying the first HARQ-ACK codebook overlaps the third resource carrying the second HARQ-ACK codebook, the terminal device compares priorities of the two HARQ-ACK codebooks. When the priority of the first HARQ-ACK codebook is higher than the priority of the second HARQ-ACK codebook, the terminal device sends the first HARQ-ACK codebook on the second resource. When the priority of the second HARQ-ACK codebook is higher than the priority of the first HARQ-ACK codebook, the terminal device sends the second HARQ-ACK codebook on the third resource.

When the second resource carrying the first HARQ-ACK codebook does not overlap the third resource carrying the second HARQ codebook, the first HARQ-ACK codebook and the second HARQ-ACK codebook may be respectively sent on the second resource and the third resource.

Manner 3: The terminal device determines the second resource based on the first feedback information and the second feedback information.

Optionally, in the case that a fourth resource partially or completely overlaps the third resource, and a third HARQ-ACK codebook and the second HARQ-ACK codebook have a same priority, the terminal device determines the second resource based on the first HARQ-ACK codebook. The fourth resource carries the third HARQ-ACK codebook, the third resource carries the second HARQ-ACK codebook, the third HARQ-ACK codebook includes the first feedback information, the second HARQ-ACK codebook includes the second feedback information, and the first HARQ-ACK feedback codebook includes the first feedback information and the second feedback information.

For example, the terminal device generates the third HARQ-ACK codebook including the first feedback information, and determines the first resource in the first time unit based on the third HARQ-ACK codebook. For a specific manner of determining the third HARQ-ACK codebook and a specific manner of determining the first resource in the first time unit, refer to the description of the manner of determining the first HARQ-ACK codebook in Manner 1. For example, the first resource is determined based on a total quantity of bits of feedback information included in the third HARQ-ACK codebook. When the first resource includes a non-uplink resource and the third HARQ-ACK codebook cannot be sent on the first resource, and it is determined that the fourth resource in the second time unit carries the third HARQ-ACK codebook, a manner of determining the fourth resource in the second time unit is that a time-frequency location of the fourth resource in the second time unit is the same as a time-frequency location of the first resource in the first time unit.

However, the terminal device originally needs to send the second HARQ-ACK codebook on the third resource in the second time unit based on a time sequence relationship between data and feedback information of the data. For a specific manner of determining the second HARQ-ACK codebook and the third resource, refer to the description in Manner 2.

When the fourth resource partially or completely overlaps the third resource, and the third HARQ-ACK codebook and the second HARQ-ACK codebook have a same priority, the terminal device determines the second resource based on the first HARQ-ACK codebook. The first HARQ-ACK codebook includes first feedback information and second feedback information. In S240, the terminal device sends the first HARQ-ACK codebook on the second resource.

Optionally, the first HARQ-ACK codebook is generated by the terminal device based on the first feedback information and the second feedback information.

Specifically, the first HARQ-ACK codebook is generated by the terminal device in a codebook generation manner based on N pieces of feedback information that originally need to be sent in the first time unit and L pieces of feedback information that originally need to be sent in the second time unit and that are determined based on a time sequence relationship between data and feedback information. The N pieces of feedback information include the first feedback information, and the L pieces of feedback information include the second feedback information.

Optionally, the first HARQ-ACK codebook is generated by the terminal device based on the third HARQ-ACK codebook and the second HARQ-ACK codebook.

For example, the first HARQ-ACK codebook is obtained by connecting the third HARQ-ACK codebook and the second HARQ-ACK codebook in series. For example, it may be specified that the third HARQ-ACK codebook that is sent after the first time unit and that is postponed to be sent in the second time unit is arranged before, and the second HARQ-ACK codebook that needs to be sent in the second time unit and that is determined based on a time sequence relationship between data and feedback information of the data is arranged after. Alternatively, on the contrary, the second HARQ-ACK codebook is arranged before, and the third HARQ-ACK codebook that is sent after the first time unit and that is postponed to be sent in the second time unit is arranged after. However, this application is not limited thereto. The terminal device determines the second resource based on the first HARQ-ACK codebook. For a manner of determining the second resource, refer to the foregoing manner of determining the PUCCH resource in the time unit in which the feedback information is located. Details are not described again.

S240. The terminal device sends the first feedback information on the second resource.

Correspondingly, the network device receives the first feedback information from the terminal device on the second resource.

In a possible implementation, the terminal device sends a first HARQ-ACK codebook on the second resource, where the first HARQ-ACK codebook includes the first feedback information.

Optionally, the first HARQ-ACK codebook further includes second feedback information. For a specific manner of generating the first HARQ-ACK codebook, refer to the description in S230. Details are not described again.

According to the solution of this application, in the case that the first resource carrying the feedback information of the first data includes a non-uplink resource, the terminal device sends the feedback information on the second resource, where the second resource is an uplink resource after the first resource. This can avoid retransmission of the first data because the feedback information cannot be sent, reduce a waste of communication resources, and improve communication quality.

The method provided in embodiments of this application is described above in detail with reference to FIG. 2 to FIG. 5. Apparatuses provided in embodiments of this application are described below in detail with reference to FIG. 6 to FIG. 8.

Figure 6:
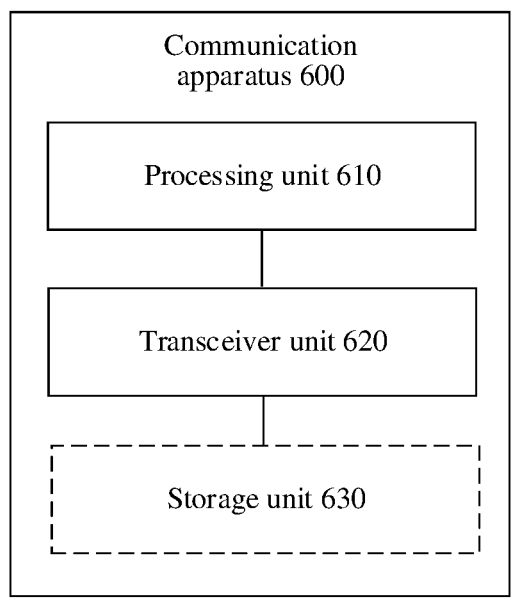
FIG. 6 is a schematic block diagram of an example of a communication apparatus according to this application.

FIG. 6 is a schematic block diagram of a communication apparatus according to an embodiment of this application. As shown in FIG. 6, the communication apparatus 600 may include a processing unit 610 and a transceiver unit 620.

In a possible design, the communication apparatus 600 may correspond to the terminal device in the foregoing method embodiments, or may correspond to a chip configured on (or used for) the terminal device.

It should be understood that the communication apparatus 600 may correspond to the terminal device in the method 200 according to embodiments of this application, and the communication apparatus 600 may include units configured to perform the method performed by the terminal device in the method 200 in FIG. 2. In addition, the units in the communication apparatus 600 and the foregoing other operations and/or functions are separately intended to implement corresponding procedures of the method 200 in FIG. 2.

It should be further understood that in the case that the communication apparatus 600 is a chip configured on (or used for) the terminal device, the transceiver unit 620 in the communication apparatus 600 may be an input/output interface or a circuit of the chip, and the processing unit 610 in the communication apparatus 600 may be a processor in the chip.

Optionally, the communication apparatus 600 may further include a processing unit 610, and the processing unit 610 is configured to process instructions or data, to implement corresponding operations.

Optionally, the communication apparatus 600 may further include a storage unit 630, and the storage unit 630 is configured to store instructions or data. The processing unit 610 may execute the instructions or data stored in the storage unit to cause the communication apparatus to implement corresponding operations. In the communication apparatus 600, the transceiver unit 620 may correspond to a transceiver 1610 in a terminal device 1600 shown in FIG. 7, and the storage unit 630 may correspond to a memory in the terminal device 1600 shown in FIG. 7.

It should be understood that a specific process in which the units perform the foregoing corresponding steps has been described in detail in the foregoing method embodiments. For brevity, details are not described herein again.

Figure 7:
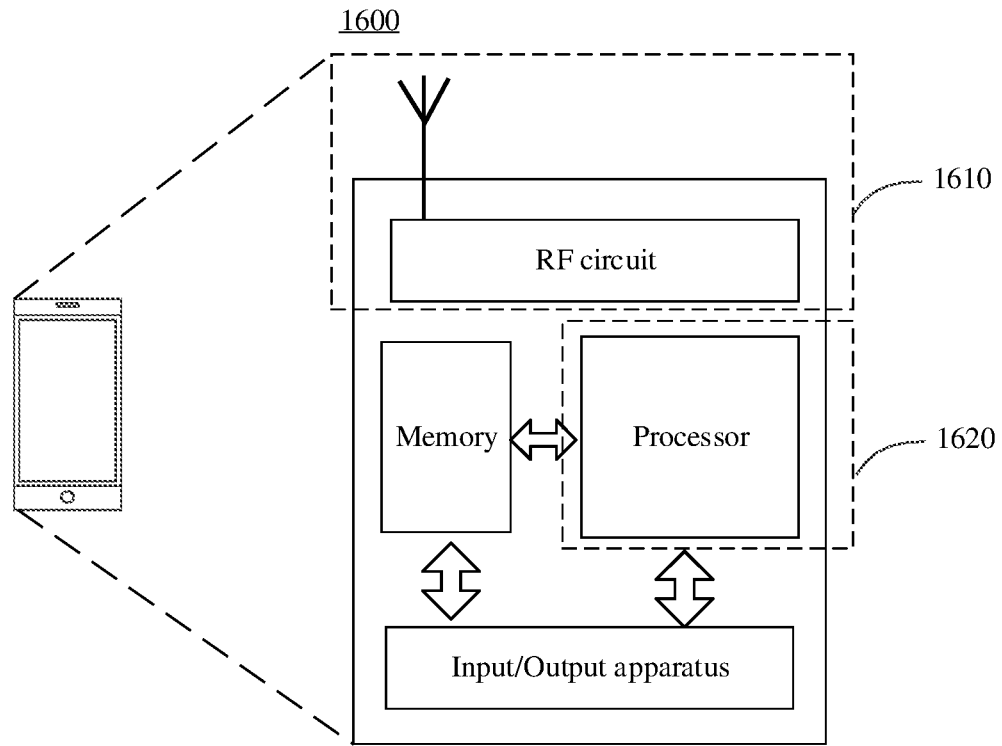
FIG. 7 is an example schematic diagram of a structure of a terminal device according to this application.

It should be further understood that in the case that the communication apparatus 600 is a terminal device, the transceiver unit 620 in the communication apparatus 600 may be implemented through a communication interface (such as a transceiver or an input/output interface), for example, may correspond to the transceiver 1610 in the terminal device 1600 shown in FIG. 7, and the processing unit 610 in the communication apparatus 600 may be implemented through at least one processor, for example, may correspond to a processor 1620 in the terminal device 1600 shown in FIG. 7, or the processing unit 610 in the communication apparatus 600 may be implemented through at least one logic circuit.

In another possible design, the communication apparatus 600 may correspond to the network device in the foregoing method embodiments, or may correspond to a chip configured on (or used for) the network device.

It should be understood that the communication apparatus 600 may correspond to the network device in the method 200 according to embodiments of this application, and the communication apparatus 600 may include units configured to perform the method performed by the network device in the method 200 in FIG. 2. In addition, the units in the communication apparatus 600 and the foregoing other operations and/or functions are separately intended to implement corresponding procedures of the method 200 in FIG. 2.

It should be further understood that in the case that the communication apparatus 600 is a chip configured on (or used for) the network device, the transceiver unit in the communication apparatus 600 is an input/output interface or a circuit in the chip, and the processing unit 610 in the communication apparatus 600 may be a processor in the chip.

Optionally, the communication apparatus 600 may further include a processing unit 610, and the processing unit 610 is configured to process instructions or data, to implement corresponding operations.

Optionally, the communication apparatus 600 may further include a storage unit 630. The storage unit may be configured to store instructions or data. The processing unit may execute the instructions or data stored in the storage unit 630, to cause the communication apparatus to implement corresponding operations. The storage unit 630 in the communication apparatus 600 may correspond to a memory in a network device 1700 shown in FIG. 8.

It should be understood that a specific process in which the units perform the foregoing corresponding steps has been described in detail in the foregoing method embodiments. For brevity, details are not described herein again.

Figure 8:
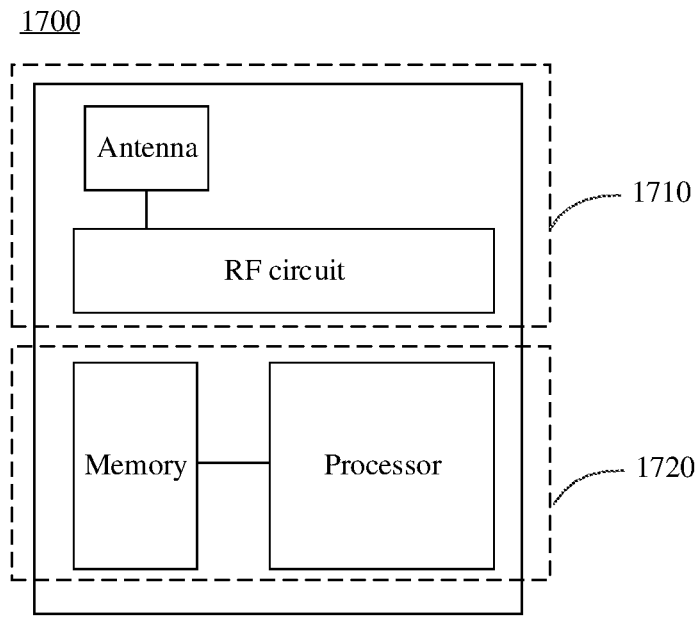
FIG. 8 is an example schematic diagram of a structure of a network device according to this application.

It should be further understood that in the case that the communication apparatus 600 is a network device, the transceiver unit 620 in the communication apparatus 600 may be implemented through a communication interface (such as a transceiver or an input/output interface), for example, may correspond to the transceiver 1710 in the network device 1700 shown in FIG. 8, and the processing unit 610 in the communication apparatus 600 may be implemented through at least one processor, for example, may correspond to a processor 1720 in the network device 1700 shown in FIG. 8, or the processing unit 610 in the communication apparatus 600 may be implemented through at least one logic circuit.

FIG. 7 is a schematic diagram of a structure of a terminal device 1600 according to an embodiment of this application. The terminal device 1600 may be used in the system shown in FIG. 1, to perform functions of the terminal device in the foregoing method embodiments. As shown in the figure, the terminal device 1600 includes a processor 1620 and a transceiver 1610. Optionally, the terminal device 1600 further includes a memory. The processor 1620, the transceiver 1610, and the memory may communicate with each other through an internal connection path, to transfer a control signal and/or a data signal. The memory is configured to store a computer program. The processor 1620 is configured to execute the computer program in the memory, to control the transceiver 1610 to receive and send a signal.

The processor 1620 and the memory may be integrated into a processing apparatus, and the processor 1620 is configured to execute program code stored in the memory to implement the foregoing functions. During specific implementation, the memory may be integrated into the processor 1620, or independent of the processor 1620. The processor 1620 may correspond to the processing unit in FIG. 6.

The transceiver 1610 may correspond to the transceiver unit in FIG. 6. The transceiver 1610 may include a receiver (also referred to as a receiver machine or a receiver circuit) and a transmitter (also referred to as a transmitter machine or a transmitter circuit). The receiver is configured to receive a signal, and the transmitter is configured to transmit a signal.

It should be understood that the terminal device 1600 shown in FIG. 7 can implement all processes of the terminal device in the method embodiment of FIG. 2. Operations and/or functions of modules in the terminal device 1600 are used to implement corresponding procedures in the foregoing method embodiments. For details, refer to the descriptions in the foregoing method embodiments. To avoid repetition, detailed descriptions are appropriately omitted herein.

The processor 1620 may be configured to perform an action that is implemented inside the terminal device and that is described in the foregoing method embodiments. The transceiver 1610 may be configured to perform a sending action by the terminal device to the network device or a receiving action from the network device in the foregoing method embodiments. For details, refer to the descriptions in the foregoing method embodiments. Details are not described herein again.

Optionally, the terminal device 1600 may further include a power supply, configured to supply power to various components or circuits in the terminal device.

In addition, to improve functions of the terminal device, the terminal device 1600 may further include one or more of an input unit, a display unit, an audio circuit, a camera, a sensor, and the like, and the audio circuit may further include a speaker, a microphone, and the like.

FIG. 8 is a schematic diagram of a structure of a network device according to an embodiment of this application. The network device 1700 may be used in the system shown in FIG. 1, to perform functions of the network device in the foregoing method embodiments. For example, FIG. 8 may be a schematic diagram of a related structure of the network device.

It should be understood that the network device 1700 shown in FIG. 8 can implement all processes of the network device in the method embodiment of FIG. 2. Operations and/or functions of modules in the network device 1700 are used to implement corresponding procedures in the foregoing method embodiments. For details, refer to the descriptions in the foregoing method embodiments. To avoid repetition, detailed descriptions are appropriately omitted herein.

It should be understood that the network device 1700 shown in FIG. 8 is merely a possible architecture of the network device, and this shall not constitute any limitation on this application. The method provided in this application is applicable to a network device in another architecture, for example, a network device including a CU, a DU, and an AAU. A specific architecture of the network device is not limited in this application.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller (MCU), a programmable controller (PLD), or another integrated chip.

In an implementation process, the steps in the foregoing methods can be implemented by using a hardware integrated logic circuit in the processor, or by using instructions in a form of software. The steps of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor. To avoid repetition, details are not described herein again.

It should be noted that, the processor in embodiments of this application may be an integrated circuit chip, and has a signal processing capability. In an implementation process, the steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor. The steps in the method disclosed with reference to embodiments of this application may be directly performed and completed by a hardware decoding processor, or may be performed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (RAM) and is used as an external cache. For example but not for limitation, RAMs in many forms may be used, such as a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these and any memory of another appropriate type.

According to the method provided in embodiments of this application, this application further provides a computer program product. The computer program product includes computer program code. When the computer program code is executed by one or more processors, an apparatus including the one or more processors is enabled to perform the method in the embodiment shown in FIG. 2.

According to the method provided in embodiments of this application, this application further provides a computer-readable storage medium. The computer-readable storage medium stores program code. When the program code is executed by one or more processors, an apparatus including the one or more processors is enabled to perform the method in the embodiment shown in FIG. 2.

According to the method provided in embodiments of this application, this application further provides a system, including the foregoing one or more network devices. The system may further include the foregoing one or more terminal devices.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the receiving or sending step may be performed by the processing unit (the processor). For specific functions of the units, refer to corresponding method embodiments. There may be one or more processors.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the one or more computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the receiving or sending step may be performed by the processing unit (the processor). For specific functions of the units, refer to corresponding method embodiments. There may be one or more processors.

Terms such as "component", "module", and "system" used in this specification are used to indicate a computer-related entity, hardware, firmware, a combination of hardware and software, software, or software being executed. For example, a component may be, but is not limited to, a process that is run on a processor, an object, an executable file, a thread of execution, a program, and/or a computer. As illustrated by using figures, both a computing device and an application that is run on the computing device may be components. One or more components may reside within a process and/or a thread of execution, and a component may be located on one computer and/or distributed between two or more computers. In addition, these components may be executed by various computer-readable media that store various data structures. The components may communicate via a local and/or remote process and based on, for example, a signal having one or more data packets (for example, data from two components interacting with another component in a local system, in a distributed system, and/or across a network such as the Internet interacting with other systems through the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units may be integrated into one unit.

In the foregoing embodiments, all or some of the functions of the functional units may be implemented by software, hardware, firmware, or any combination thereof. When software is used to implement the embodiments, all or some of the embodiments may be implemented in a form of a computer program product. The computer program product includes one or more computer instructions (programs). When the one or more computer instructions (programs) are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (for example, a DVD), a semiconductor medium (for example, a solid state disk (SSD)), or the like.

When the functions are implemented in the form of a software function unit and sold or used as an independent product, the functions may be stored in a computer-readable storage medium. Based on such an understanding, the technical solutions of this application essentially, or the part contributing to the related art, or some of the technical solutions may be implemented in a form of a software product. The software product is stored in a storage medium, and includes several instructions for instructing a computer device (which may be a personal computer, a server, or a network device) to perform all or some of the steps of the method described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining a first resource in a first time unit, wherein the first resource is used to send first feedback information of first data; and
   sending a first hybrid automatic repeat request (HARQ-ACK) codebook with the first feedback information to a network device on a second resource in a second time unit in response to determining that the first resource comprises a non-uplink resource and that the second resource partially or completely overlaps a third resource and a priority of the first HARQ-ACK codebook is higher than a priority of a second HARQ-ACK codebook, wherein the third resource carries the second HARQ-ACK codebook and the second HARQ-ACK codebook comprises second feedback information, and the second feedback information is feedback information of second data, wherein the second time unit is later than the first time unit in time.

2. The method according to claim 1, further comprising:
   receiving second information from the network device, wherein the second information indicates a first time interval; and
   determining the second time unit such that an interval between the second time unit and a third time unit is less than or equal to the first time interval, wherein the third time unit is where a first downlink shared channel (PDSCH) carrying the first data is located.

3. The method according to claim 1, wherein the non-uplink resource comprises one or more of the following resources:
   a downlink resource, a flexible resource, or a reserved resource.

4. A method, comprising:
   determining a first resource in a first time unit, wherein the first resource is used to receive first feedback information of first data; and
   receiving a first hybrid automatic repeat request (HARQ-ACK) codebook with the first feedback information from a terminal device on a second resource in a second time unit in response to determining that the first resource comprises a non-uplink resource and that the second resource partially or completely overlaps a third resource and a priority of the first HARQ-ACK codebook is higher than a priority of a second HARQ-ACK codebook, wherein the third resource carries the second HARQ-ACK codebook, the second HARQ-ACK codebook comprises second feedback information, and the second feedback information is feedback information of second data, wherein the second time unit is later than the first time unit in time.

5. The method according to claim 4, further comprising: sending second information to the terminal device, wherein the second information indicates a first time interval that is larger than or equal to an interval between the second time unit and a third time unit, wherein the third time unit is where a first downlink shared channel (PDSCH) carrying the first data is located.

6. The method according to claim 4, wherein the non-uplink resource comprises one or more of the following resources:
a downlink resource, a flexible resource, or a reserved resource.

7. A communication apparatus, comprising:
at least one processor; and
a memory storing programming instructions that are executable by the at least one processor, the programming instructions instructing the communication apparatus to perform operations comprising:
determining a first resource in a first time unit, the first resource is used to send first feedback information, wherein the first feedback information is feedback information of first data; and
sending a first hybrid automatic repeat request (HARQ-ACK) codebook with the first feedback information to a network device on a second resource in a second time unit in response to determining that the first resource comprises a non-uplink resource and that the second resource partially or completely overlaps a third resource and a priority of the first HARQ-ACK codebook is higher than a priority of a second HARQ-ACK codebook, wherein the third resource carries the second HARQ-ACK codebook and the second HARQ-ACK codebook comprises second feedback information, and the second feedback information is feedback information of second data, wherein the second time unit is later than the first time unit in time.

8. The apparatus according to claim 7, wherein the operations further comprise:
receiving second information from the network device, wherein the second information indicates a first time interval; and
determining the second time unit such that an interval between the second time unit and a third time unit is less than or equal to the first time interval, wherein the third time unit is where a first downlink shared channel (PDSCH) carrying the first data is located.

9. The apparatus according to claim 7, wherein the non-uplink resource comprises one or more of the following resources:
a downlink resource, a flexible resource, or a reserved resource.

10. A communication apparatus, comprising:
at least one processor; and
a memory storing programming instructions that are executable by the at least one processor, the programming instructions instructing the communication apparatus to perform operations comprising:
determining, a first resource in a first time unit, wherein the first resource carries first feedback information of first data; and
receiving a first hybrid automatic repeat request (HARQ-ACK) codebook with the first feedback information from a terminal device on a second resource in a second time unit in response to determining that the first resource comprises a non-uplink resource and that the second resource partially or completely overlaps a third resource and a priority of the first HARQ-ACK codebook is higher than a priority of a second HARQ-ACK codebook, wherein the third resource carries the second HARQ-ACK codebook, the second HARQ-ACK codebook comprises second feedback information, and the second feedback information is feedback information of second data, wherein the second time unit is later than the first time unit in time.

11. The apparatus according to claim 10, wherein the operations further comprise:
sending second information to the terminal device, wherein the second information indicates a first time interval that is larger than or equal to an interval between the second time unit and a third time unit, wherein the third time unit is where a first downlink shared channel (PDSCH) carrying the first data is located.

12. The apparatus according to claim 10, wherein the non-uplink resource comprises one or more of the following resources:
a downlink resource, a flexible resource, or a reserved resource.

* * * * *